(12) United States Patent
Kim

(10) Patent No.: US 8,081,995 B2
(45) Date of Patent: Dec. 20, 2011

(54) COMMUNICATION METHOD THROUGH NETWORK AND TERMINAL THEREOF

(75) Inventor: Myung-Sup Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 12/469,277

(22) Filed: May 20, 2009

(65) Prior Publication Data

US 2010/0093383 A1    Apr. 15, 2010

(30) Foreign Application Priority Data

Oct. 9, 2008 (KR) .......................... 10-2008-0098953

(51) Int. Cl.
*H04B 7/00* (2006.01)
(52) U.S. Cl. ..................... 455/500; 701/200; 701/202
(58) Field of Classification Search .............. 455/500, 455/517, 41.2, 552.1, 553.1, 3.01; 370/254, 370/400, 338, 352, 370; 701/35, 200–226
See application file for complete search history.

(56) References Cited

U.S. PATENT DOCUMENTS

| | | | |
|---|---|---|---|
| 2004/0147223 A1* | 7/2004 | Cho | 455/41.2 |
| 2006/0009248 A1* | 1/2006 | Sakamoto et al. | 455/517 |
| 2007/0002833 A1* | 1/2007 | Bajic | 370/352 |
| 2007/0195713 A1* | 8/2007 | Khan et al. | 370/254 |
| 2007/0217382 A1* | 9/2007 | Minamizawa | 370/338 |
| 2007/0244614 A1* | 10/2007 | Nathanson | 701/35 |

* cited by examiner

*Primary Examiner* — Lana N Le
*Assistant Examiner* — Golam Sorowar
(74) *Attorney, Agent, or Firm* — Birch, Stewart, Kolasch & Birch, LLP

(57) ABSTRACT

A communication method through a network and a terminal thereof, where the terminal includes a transmitting/receiving unit configured to transmit a message containing information on a specific subject of interest and receive a response message from other terminal sharing the subject of interest; and a controller configured to connect to the other terminal through a network.

28 Claims, 9 Drawing Sheets

FIG. 9A

| Type | Information of interest | HopCount | RREQ ID |
|---|---|---|---|
| Destination IP Address ||| Destination Sequence Number |
| Originator IP Address ||| Originator Sequence Number |
| Time Stamp ||| Firsthop |

FIG. 9B

| Type | Information of interest | HopCount | Destination IP Address |
|---|---|---|---|
| Destination Sequence Number ||| Originator IP Address |
| Life Time ||| Time Stamp |
| RREP ID ||| Firsthop |

FIG. 9C

| category | 2nd byte | | 3rd byte | | Explanation |
|---|---|---|---|---|---|
| | Upper four bits | Lower four bits | Upper four bits | Lower four bits | |
| Traffic information | 0 | 0 | 0 | 0 | traffic information of Olympic Bridge |
| | 0 | 0 | 0 | 1 | traffic information of the roads in front of Cheonho Intersection |
| | 0 | 0 | 0 | 2 | traffic information of the roads in front of Olympic Park |
| ⋮ | | | | | |
| music | 1 | 0 | 0 | 0 | favorite genre is ballade |
| | 1 | 0 | 0 | 2 | favorite genre is dance |
| | 1 | 0 | 0 | 2 | favorite genre is rock |

COMMUNICATION METHOD THROUGH NETWORK AND TERMINAL THEREOF

CROSS REFERENCE TO RELATED APPLICATIONS

This nonprovisional application claims priority under 35 U.S.C. §119(a) on Patent Application No. 10-2008-0098953 filed in Republic of Korea on Oct. 9, 2008 the entire contents of which are hereby incorporated by reference.

BACKGROUND OF THE INVENTION

1. Field of the Invention

This document relates to a communication method through a network and a terminal thereof.

2. Discussion of the Related Art

A navigation system estimates a network of roads between source and destination locations and provides an optimum route for various moving objects including vehicles.

To this end, in the navigation system, a GPS receiver receives a navigation message transmitted from a GPS (global positioning system) satellite, and a sensor, such as a gyroscope and a speed sensor, may be installed on a moving object to detect a travel status of the moving object. The navigation system also determines a current location of the traveling moving object through a dead-reckoning process that uses the navigation message received by the GPS receiver and a travel status detect signal of the moving object detected by the sensors. The current location of the moving object is then matched and displayed together with map data on a display screen of the navigation system.

SUMMARY OF THE INVENTION

An aspect of this document is to provide a communication method through a network and a terminal thereof.

In one aspect, a terminal includes a transmitting/receiving unit for transmitting a message containing information on a specific subject of interest and receiving a response message from another terminal sharing the subject of interest; and a controller connected through a network to the another terminal having received the response message.

The controller may receive information on terminals sharing the subject of interest from the another terminal through the transmitting/receiving unit.

The controller may constitute the network together with the terminals sharing the subject of interest in accordance with information on the terminals.

The information on the terminals may include identification information and communication route information which are for communicating with the terminals.

The controller may receive information on the network from the another terminal and thereby may participate in the network.

The network may be comprised of the terminals sharing the subject of interest.

If communication with a specific terminal connected to the network is interrupted for more than a preset time, the controller may transmit information on the terminal whose communication is interrupted to the terminals sharing the subject of interest.

The information on the network may include identification information and communication route information of the terminals connected to the network.

The message may be a route request message for participating in the network, and the response message may be a route response message to the route request message.

The information on the subject of interest may be recorded in reserved areas of the route request message and the route response message.

The terminal may further include a display for displaying the configuration of the network in accordance with the information on the terminals sharing the subject of interest.

There may be a plurality of subjects of interest, networks may be formed corresponding to the respective subjects of interest, and the display may comprise identifiers corresponding to the respective networks to selectively display the configuration of any one of the networks in accordance with the selection of the identifiers.

The network may be a subnet of the entire network formed based on the locations of the terminals.

In another aspect, there is a communication method through a network that includes: transmitting a message containing information on a specific subject of interest; receiving a response message from other terminal sharing the subject of interest; and connecting through a network to the other terminal having transmitted the response message.

As described above, according to the present invention, a network is formed among terminals sharing a subject of interest so that various data about the subject of interest can be transmitted and received, thereby preventing unnecessary communication.

Furthermore, as unnecessary communication is prevented, the time and cost consumed in data retrieval and communication can be cut down, and network resources can be saved.

Furthermore, via this network, a terminal located in a broadcast reception dead zone is able to receive various data through other terminals, thereby promoting the expansion of broadcast reception areas substantially at low cost.

BRIEF DESCRIPTION OF THE DRAWINGS

The implementation of this document will be described in detail with reference to the following drawings in which like numerals refer to like elements.

FIGS. 9a to 9c are views for explaining the configuration of a message containing information on a subject of interest according to the embodiment of the present invention;

DETAILED DESCRIPTION OF THE INVENTION

Hereinafter, an implementation of this document will be described in detail with reference to the attached drawings.

Figure 1:
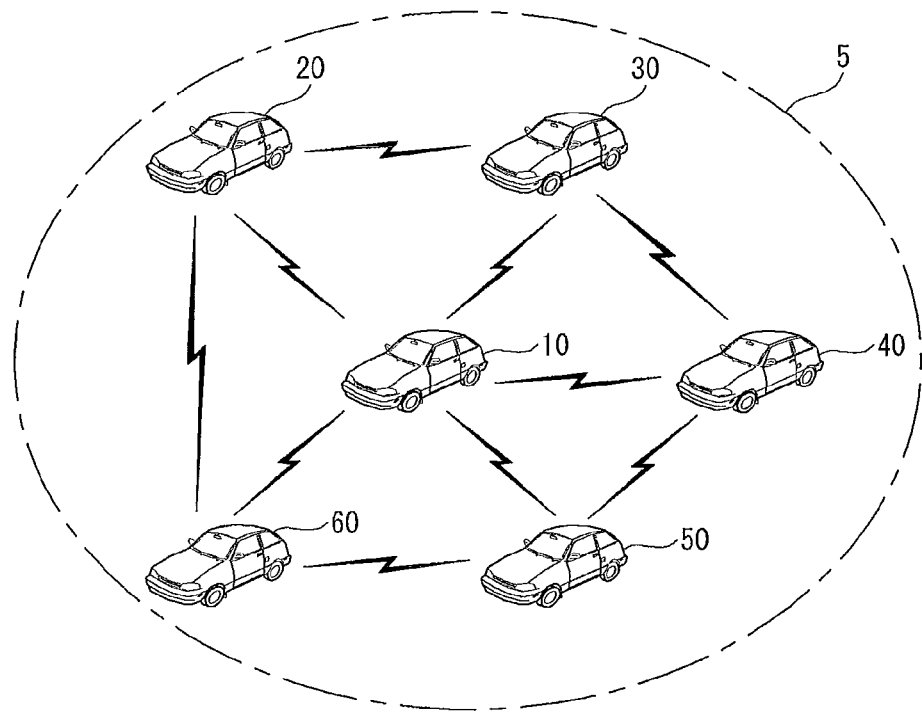
FIG. 1 is a view for explaining a wireless mesh network.

FIG. 1 is a view showing one example of a wireless mesh network 5 comprising a plurality of vehicles 10 to 60 to which the present invention is applied.

The wireless mesh network can efficiently expand the range of wireless communication because it is capable of multi-hopping and multi-linking. Standardization activities of the wireless mesh network are underway in IEEE 802.11 TGs.

Further, since a wireless communication terminal is able to select a plurality of communication routes within the wireless mesh network and transmit data, the reliability of data transmission can be improved.

Such a mesh network is configured by connections between mesh points (MP) which perform a routing function, i.e., a relay function.

The wireless communication terminal mounted within the vehicles 10 to 60 can perform wireless communication by forming a wireless mesh network together with other nearby wireless communication terminals by a peer-to-peer method. Further, the wireless communication terminals mounted within the vehicles 10 to 60 are able to communicate with other wireless communication terminals, which are beyond a direct communication range, through other nearby wireless communication terminals by a multi-hop method.

The vehicles 10 to 60 refer to all types of carriers implemented using a mechanic or electronic devices to move human beings or objects, such as general passenger cars, buses, trains, etc.

In this document, while embodiments of the present invention will be described focused on wireless communication terminals to be mounted in a general passenger car and capable of communicating with each other by forming a wireless mesh network 5, the present invention is not limited thereto and may also apply to various communication apparatuses that perform the disclosed functions.

The vehicle 10 has a terminal mounted therein which can communicate with other terminals mounted in other vehicles 20 to 60 constituting the wireless mesh network 5. Therefore, the vehicle 10 can receive travel information of peripheral vehicles from other terminals by using the terminal mounted therein, analyze the received data, and transfers the analyzed data to the user via graphic, text and/or audio signals.

Figure 2:
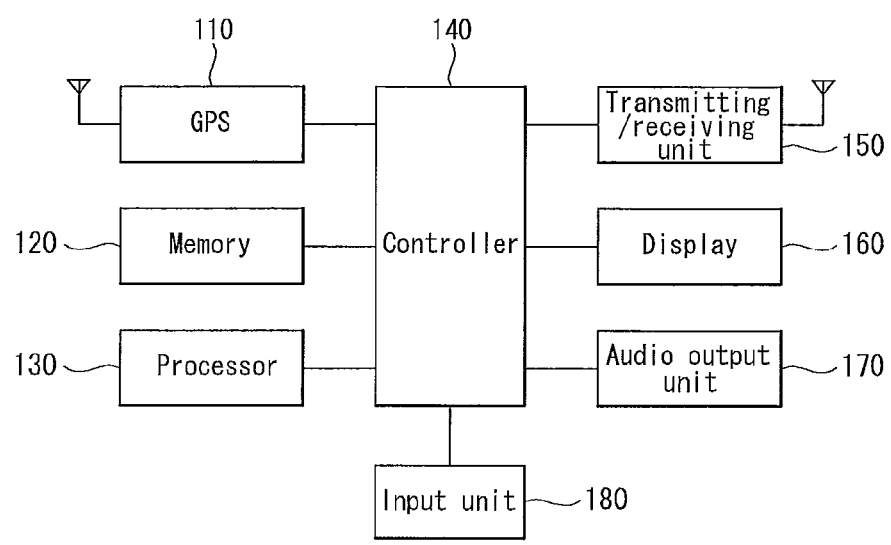
FIG. 2 is a block diagram showing the construction of a terminal according to an embodiment of the present invention.

FIG. 2 is a view showing the construction of a terminal for communication through a network according to the present invention.

The terminal 100 includes many types of portable terminals, including a navigation terminal, which are mounted in a vehicle and provided with a display capable of displaying graphic information by interworking with a GPS receiver (GPS module) that receives a navigation message from a GPS satellite within the vehicle. Hereinafter, the vehicle 10 having such a terminal 100 mounted therein is called an "own vehicle".

Referring to FIG. 2, the terminal 100 includes a GPS receiver 110, a memory 120, a processor 130, a controller 140, a transmitting/receiving unit 150, a display 160, an audio output unit 170, and an input unit 180.

Hereinafter, other terminals refer to the terminals mounted in the above-mentioned other vehicles 20 to 60.

The GPS receiver 110 receives a navigation message transmitted from the GPS satellite via an antenna (not shown) and provides the message to the processor 140. Thus, the terminal 100 can perform various functions performed by using a navigation message, including the provision of a navigation function based on a navigation message or the collection of travel information of the vehicle 10 having the terminal 100 mounted therein. Here, the GPS receiver 110 may be include in a terminal as in this example, but may be mounted as a separate device in a vehicle and connected to the terminal 100 to perform its function.

The memory 120 stores programs and data required for performing various functions provided by the terminal and various data generated in accordance with the operation of the terminal 100.

Further, the memory 120 stores information on other terminal sharing a subject of interest with the terminal 100, and if a network is formed in accordance with information on the vehicles sharing the subject of interest, stores various data about the subject of interest transmitted and received through the network.

Further, the memory 120 stores map data required for operating the vehicle 10 based on the navigation message received from the GPS satellite. The map data may include various geographical data including topographical information or graphic data, as well as basic data including, for example, road junctions such as an intersection with other roads, a network of links connecting the junctions, and a link distance.

In addition, the terminal 100 does not store the map data in an electronic map format due to a limited memory capacity, the above-described various geographical data may be stored in the form of text in the memory 120.

The processor 130 creates various messages for communicating with other terminals, and analyzes a message received from the terminals.

Particularly, the processor 130 creates a route request message for connecting to other terminal sharing a subject of interest, and analyzes a route response message received from the terminal sharing the subject of interest.

In addition, the processor 130 analyzes a message received by communication with other terminal that has transmitted the route response message, and extracts information on other terminals sharing the subject of interest. Thus, the controller 140 performs communication with other terminals sharing the subject of interest, and the processor 130 processes various data transmitted and received by communication with other terminals sharing the subject of interest and transfers them to the controller 140.

The controller 140 controls the overall operation of each of the components of the terminal 100. Particularly, the controller 140 transmits a route response message for connecting to other terminal sharing the subject of interest through the transmitting/receiving unit 150 and searches for information on other terminals sharing the subject of interest. Then, the controller 140 performs communication in accordance with the searched information by forming a network together with other terminals sharing the subject of interest.

In addition, if communication with a specific terminal that is participating in the network is delayed for more than a predetermined time, the controller 140 transmits a message to inform other terminals included in the network that the specific terminal has deviated from the network.

In addition, the controller 140 may perform a navigation function by analyzing a navigation message received through the GPS receiver 110 and analyzing information inputted through various sensors (not shown), such as a gyroscope and a speed sensor, which are installed in an own vehicle.

In one embodiment, the processor 130 and the controller 140 are implemented as separate components, but they may be implemented as one component, such as a central processing unit (CPU) having sufficient information processing capacity, to perform both information processing and control functions.

The transmitting/receiving unit 150 performs communication directly or in a multi-hop method with the terminals mounted in the peripheral vehicles 20 to 60 in according with control of the controller 140. The transmitting/receiving unit 150 is provided with a communication module used for forming a mesh network with such peripheral vehicles 20 to 60. Besides, the transmitting/receiving unit 150 may further include a module for performing communication in a method such as CDMA, GSM, Internet, or the like.

The controller 140 controls the transmitting/receiving unit 150 such that the subject of interest is included in a message, for example, a path request message PREQ or a route request message RREQ, and is broadcasted to the peripheral terminals 20 to 60. Subsequently, the controller 140 receives a response message to the above message, for example, a route response message RRES or a path response message PRES from any terminal sharing the subject of interest among the terminals mounted in the peripheral vehicles 20 to 60. In addition, the controller 140 may transmit and receive various data about the subject of interest to and from other terminals participating in the network by participating in the network of the terminals sharing the subject of interest through the terminal that has transmitted the response message.

The display 160 may be implemented as a display device, such as a liquid crystal display LCD, to display a video signal inputted from the controller 140.

Further, the display 160 may be implemented as a touch screen to perform a display function. Moreover, the display 160 may be implemented to display various functions of the terminal 100 in a menu structure and also to simultaneously perform an input function for executing a menu selected according to a touch using the user's finger or a stylus pen.

In the event of an emergency or a situation requiring guidance, the audio output unit 170 may receive an audio source file from the memory 120 and generate an audio signal set for alarm or voice announcement under the control of the controller 140. Further, if the navigation function is performed, the audio output unit 170 generates an audio signal set for voice announcement to guide the user along a selected route, amplifies the signal to a certain set level, and outputs the amplified signal through one or more speakers (not shown).

The input unit 180 may receive various operation commands from the user. If so, the input unit 180 applies the input commands to the controller 140. The input unit 180 may be implemented as a key input unit including at least one number key or function key, a touch pad or touch screen for inputting information according to a user's touch, or a remote controller that may be installed on a steering wheel within the vehicle for conveniently operating the terminal 100.

Figure 3:
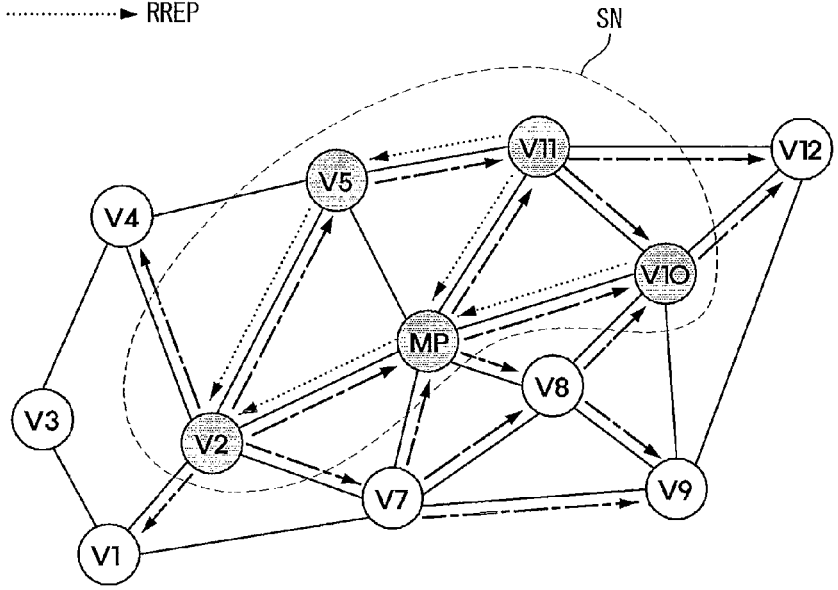
FIG. 3 is a view showing one example of a wireless mesh network formed according to the embodiment of the present invention.

FIG. 3 is a view showing one example of a wireless mesh network formed according to the present invention.

Referring to FIG. 3, vehicles V1 to V12 form a general wireless mesh network according to a regional characteristic that they are adjacent to each other. Particularly, the vehicles V2, V5, V10, and V11 share a subject of interest and therefore form a separate wireless mesh network in the form of a subnet SN of the above wireless mesh network.

Regarding the subject of interest, the vehicles V2, V5, V10, and V11 included in the subnet can transmit and receive data through communication with other vehicles included in the subnet. Further, regarding general subjects other than the subject of interest, the vehicles V2, V5, V10, and V11 included in the subnet can transmit and receive data through the entire wireless network.

To this end, the terminals mounted in the vehicles V2, V5, V10, and V11 of subnet SN manage route information of the respective terminals in the entire wireless mesh network and route information of the terminals included in the subnet consisting of the terminals sharing the subject of interest, respectively.

The vehicles sharing the subject of interest may form a wireless network, not in the form of a subnet for the entire wireless mesh network, but independently only among the vehicles sharing the subject of interest, i.e., in a manner that a plurality of networks overlap with each other. In this case, no network is formed with any vehicles other than those sharing the subject of interest, and thus communication is carried out only among the vehicles sharing the subject of interest.

Figure 4:
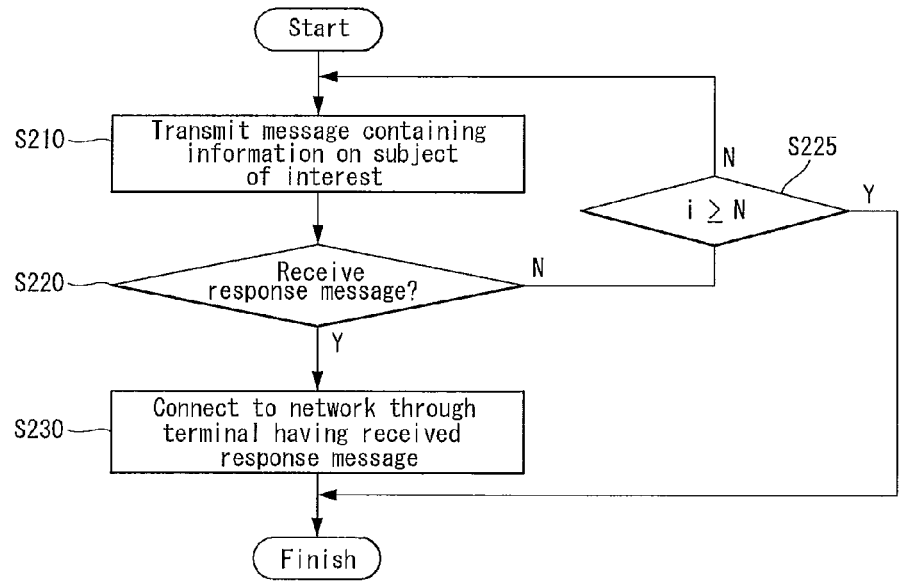
FIG. 4 is a view for explaining a procedure of forming a wireless mesh network according to the embodiment of the present invention.

FIG. 4 is a flow chart for explaining a procedure in which the terminal having the above-described construction communicates with other terminals by configuring a wireless mesh network according to the present invention. The terminals to be described hereinafter are terminals which have the same or similar construction as described with reference to FIG. 2 and are mounted in vehicles to communicate with terminals mounted in other vehicles by forming a wireless mesh network with them.

A terminal 100 that wants to communicate with other terminals sharing a subject of interest through a network will first transmit a message containing information on the subject of interest (S210). In this case, the message containing information on the subject of interest may be transmitted in a broadcasting method in which the destination is not specified.

For this, a controller 140 of the terminal 100 creates a message through the processor 130, and transmits the created message through a transmitting/receiving unit 150.

In this case, the information on the subject of interest may be, for example, traffic information, music, movies, regional information, etc. For example, the information on the subject of interest may include more detailed information, such as information on a specific genre of music or information on a specific region.

In addition, the message may be, for example, a route request message (PREQ) to be transmitted for communication by forming a network in the wireless mesh network.

The controller 140 of the terminal 100 continuously checks whether a response message to is received from other terminals or not (S220).

The terminal 100 that has received a response message connects to the network through the terminal that has transmitted the response message (S230). However, if no response message is received within a preset time, the terminal 100 may re-transmit the original message a preset number of times N (S225).

Figure 5:
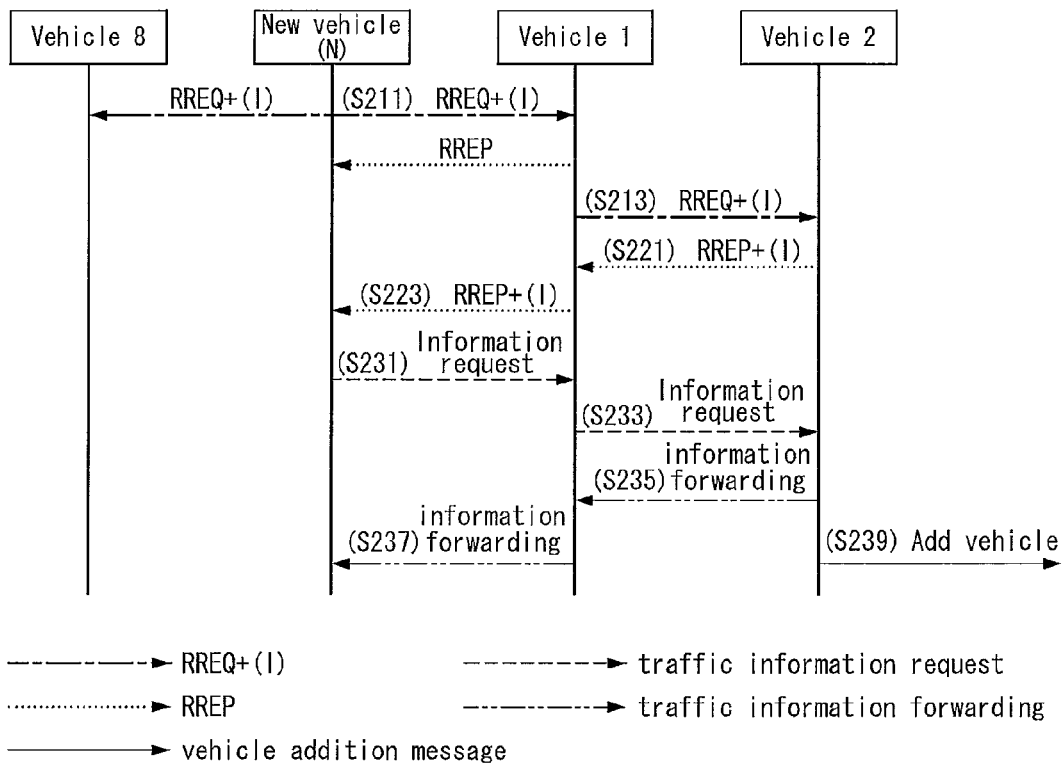
FIGS. 5 and 6 are views for explaining a method of participating in a network consisting of terminals sharing a subject of interest according to the embodiment of the present invention.
Figure 6:
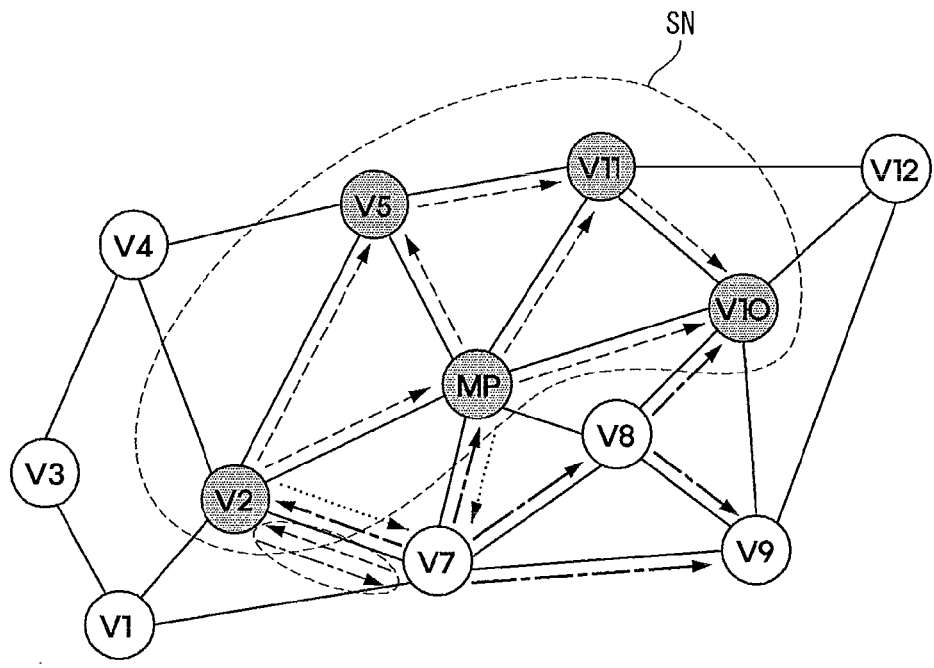

FIGS. 5 and 6 are views for explaining a process in which a new terminal N (V7 of FIG. 6) participates in a mesh network formed among other terminals and performs communication. Hereinafter, the terminals will be described by using the reference numerals of the vehicles in which the terminals are respectively mounted.

A new terminal N (or V7) that wants to participate in a wireless mesh network formed among other terminals sharing the subject of interest firstly creates a path registration message (PREG+(I)) containing information on a subject of its interest and broadcasts the message through the entire network without specifying the destination (S211).

Subsequently, terminals V1, V2, and V8 receive the transmitted path registration message PREG+(I) directly or via other terminals, particularly, the terminal V2 receives the path registration message PREG+(I) via other terminal V1 (S213).

In FIG. 6, a message transmitted by the terminal V2 requesting participation in network SN is received directly by the terminal V7.

Among the terminals, the terminals V1 and v8 do not transmit a response message to the terminal N because they do not share the subject of interest (I) contained in the path registration message PREG+(I), while the terminal V2 shares the subject of interest and hence creates a path response message PREP+(I) to the path registration message PREQ(I) containing information on the subject of interest, specifies the terminal N as the destination, and transmits the message to the terminal N. In FIG. 5, the response message PREP+(I) transmitted by the terminal V2 is received by terminal V1 and is retransmitted to the new terminal N (S223).

Subsequently, the new terminal N specifies the terminal V2 that has transmitted the response message as a destination, and transmits an information request message (S231) to the terminal V2. The information request message is received and relayed by terminal V1 (S233).

Accordingly, the terminal V2 creates and forwards a reply message to the new terminal N via other terminal V1 (S235, S237).

In this case, information on the wireless network may include a list of terminals included in the wireless network, identification information of the terminals, and information of a communication route or the like for communication with the terminals.

Further, the terminal V2 may notify other terminals connected to the network sharing the subject of interest in which the terminal V2 is included that new terminal N has joined the network (S239).

In this case, the new terminal addition message may contain identification information of the new terminal N and information on a communication route with the new terminal.

Figure 7:
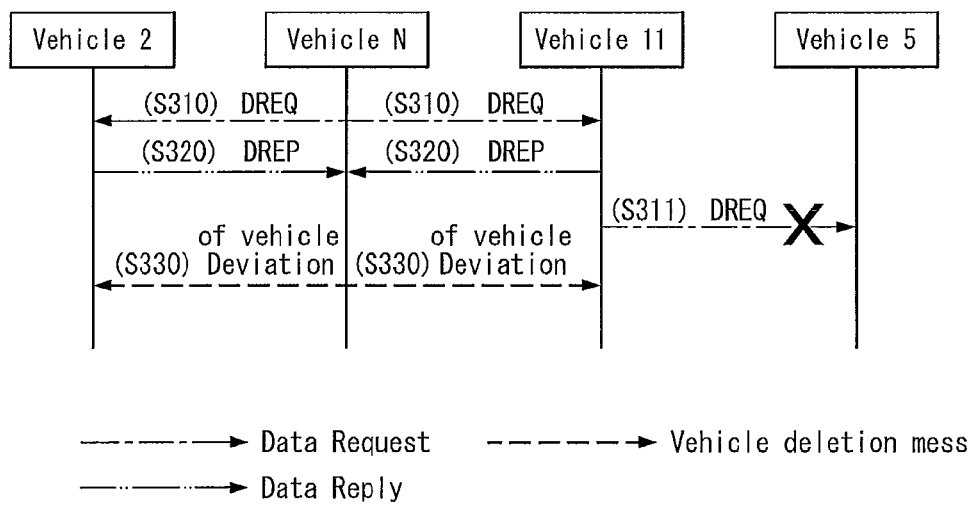
FIGS. 7 and 8 are views for explaining a communication method when a specific terminal has deviated from a network configured according to the embodiment of the present invention.
Figure 8:
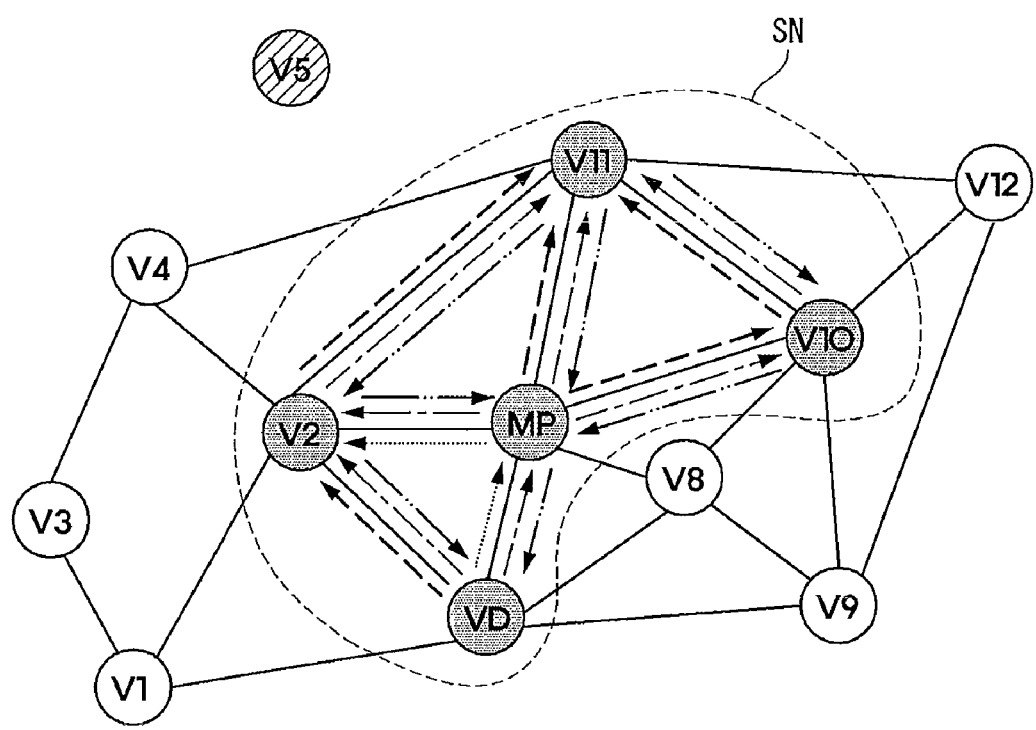

FIGS. 7 and 8 are views for explaining a communication method when a specific terminal has deviated from a network of terminals sharing information of interest.

Referring to the drawings, a terminal N or VD transmits a destination request message (DREQ) for requesting data (S310). In this case, if there is a response from terminals V2 and V11 (S320) but there is no response from a terminal V5, the terminal N or VD judges that the terminal V5 has deviated from the network. Then, the terminal N or VD notifies terminals V2 and V11 that the terminal V5 has deviated from the network (S330).

Accordingly, the terminals connected to the network can prevent a meaningless communication request to the deviated terminal V5 by modifying the information about the network.

FIGS. 9a to 9c are views for explaining the configuration of a route request message containing information on a subject of interest according to one embodiment of the present invention. Other message configurations are also possible.

The route request message of FIG. 9a and the route response message of FIG. 9b are examples of messages containing information on a subject of interest in a predefined format of a pre-defined routing protocol, e.g., in the path request/path response (PREQ/PREP) or route request/route response (RREQ/RREP) format of the Ad Hoc On Demand Distance Vector (AODV) protocol.

The AODV routing protocol is a reactive routing protocol that establishes routes only as desired by a source node. The source node transmits a PREQ (path request) to neighboring nodes in a broadcast way so as to search for a route, and the neighboring nodes broadcasts the PREQ message to the neighboring nodes to find a route to the destination.

Intermediate nodes that have received the PREQ message checks a sequence number for loop freedom from the message, and stores a reverse route. A destination node that has received the PREQ message transmits a PREP (path response) message in a unicast way through the reverse route. A forwarding route to the destination node through the route for forwarding the PREP message is stored. Accordingly, the source node having received the PREP message can transmit data to the destination node.

As seen in FIGS. 9a and 9b, information on a subject of interest may be recorded in the second and third bytes of the reserved area of the header field of the PREQ/PREP messages.

As seen in FIG. 9c, information on a subject of interest may be recorded by using the second and third bytes of the reserved area, and the category of the information on the subject of interest may be defined in the upper four bits of the second byte. Thus, a total of 16 categories may be defined.

Further, detailed information on such categories may be recorded in the lower four bits of the second byte and the third byte.

Referring to FIGS. 9a to 9c, if the category of information on a subject of interest is traffic information, detailed information, such as traffic information of Olympic Bridge, traffic information of the roads in front of Cheonho Intersection, and traffic information of the roads in front of Olympic Park, may be provided.

In addition, if the category of information on a subject of interest is music, music may be subcategorized into ballade, dance, rock, etc.

Meanwhile, if there are a plurality of two or more subjects of interest, respective wireless mesh networks for the respective subjects of interest may be separately formed, and data can be transmitted and received through separately formed the respective wireless mesh networks about their respective subjects of interest. That is to say, a wireless mesh network may be formed in such a manner that two or more subnet networks overlap with each other in one general wireless mesh network or a plurality of three or more wireless networks overlap with each other.

Figure 10A:
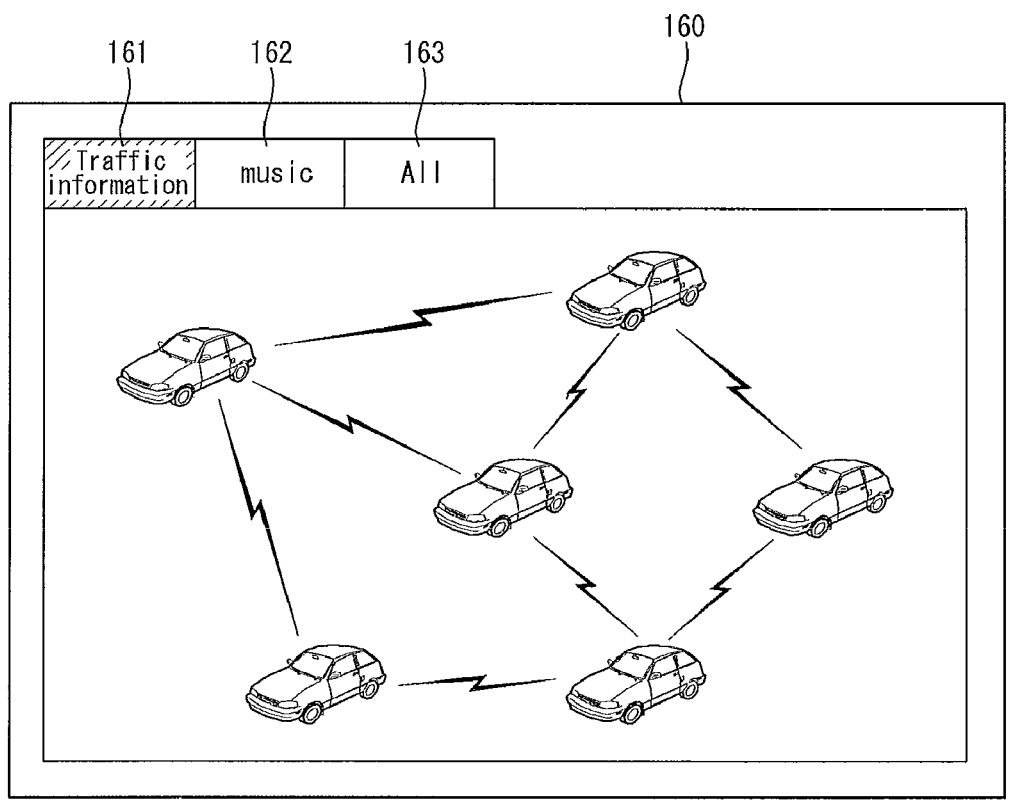
FIGS. 10a and 10b are views showing an example of a network information screen displayed according to the embodiment of the present invention.
Figure 10B:
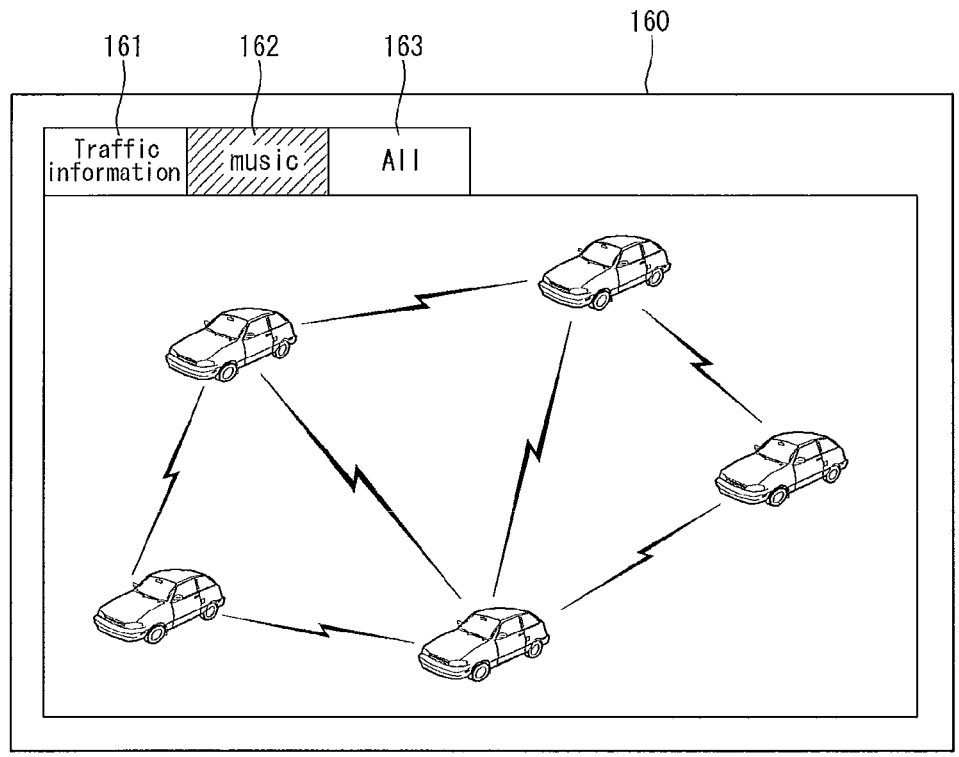

FIGS. 10a and 10b are views for explaining an example in which the terminal 100 as described with reference to FIG. 2 communicates with respective terminals sharing a plurality of subjects of interest through a separate wireless mesh network.

In this example, terminal 100 has two subjects of interest: traffic information and music, and accordingly performs communication by separately forming a wireless mesh network sharing traffic information as a subject of interest and a wireless mesh network sharing music as a subject of interest.

Therefore, the terminal 100 stores information on the two communication networks in the memory 120, and transmits and receives data about the subjects of interest through the respective networks.

In this case, for the convenience of the user, the controller 130 of the terminal 100 can view on the display 160 information or images identifying other terminals connected to the respective networks.

FIG. 10a shows a wireless mesh network formed according to a subject of interest 'traffic information' among the networks that the terminal 100 is participating in. FIG. 10b shows a wireless mesh network formed according to a subject of interest 'music' among the networks that the terminal 100 is participating in.

Referring to FIGS. 10a and 10b, when a tab 161 representing traffic information is selected on the display 160, a wireless mesh network sharing traffic information is displayed on the screen. In addition, a tab 162 representing music is selected, a wireless mesh network sharing music information is displayed on the screen. If a tab 163 representing all information is selected, the entire wireless mesh networks may be displayed (not shown). Here, tabs, a kind of identifier, are displayed for selecting each network, but various types of indicators, such as separate icons for selecting a network, may be displayed on the display 160.

Figure 11:
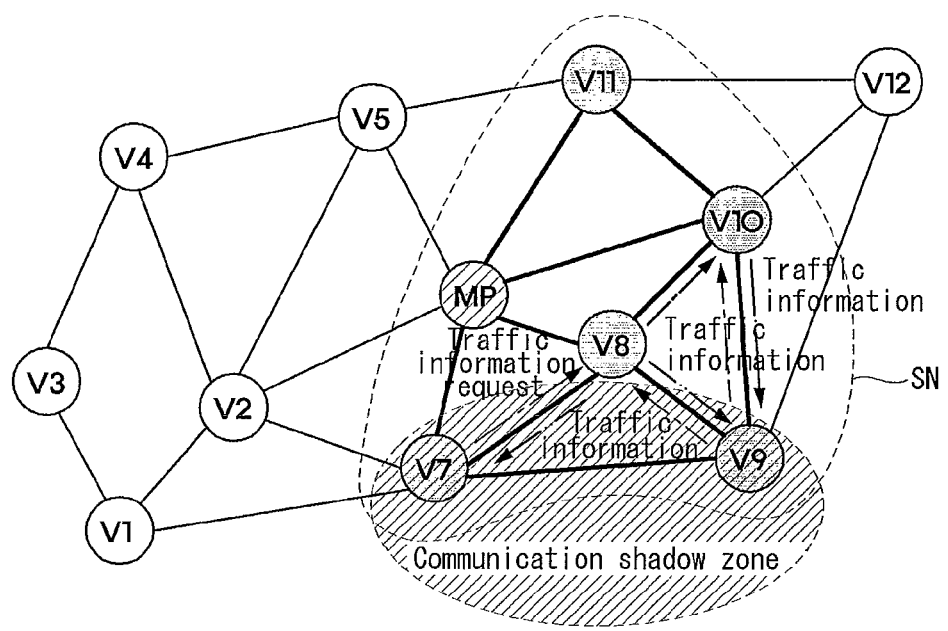
FIGS. 11 and 12 are views for explaining an example of communication through a network formed according to the present invention.
Figure 12:
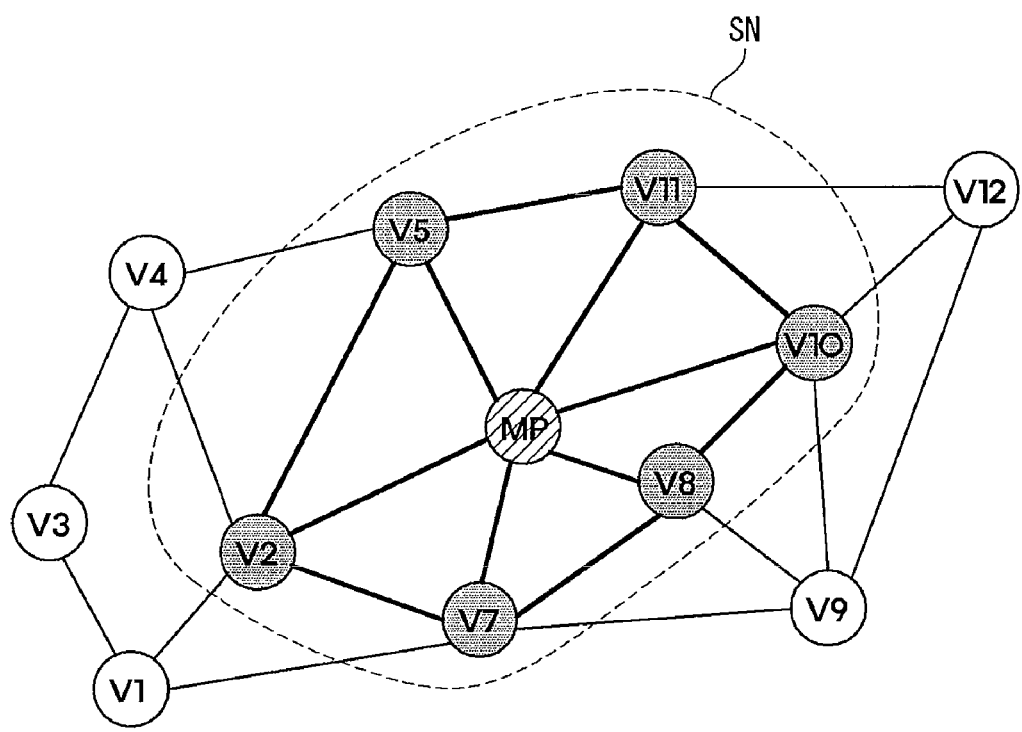

FIGS. 11 and 12 are views showing an example of a wireless mesh network based on a subject of interest formed according to the present invention.

Referring to FIG. 11, for example, a wireless mesh network is formed among terminals V7, V8, V9, V10, and V11 sharing the same destination as a subject of interest. In this case, while on the route to the destination, if the terminals V7 and V9 pass through a communication shadow zone in which the broadcast of traffic information is not received, they cannot directly receive traffic information. However, the terminals V7 and V9 are able to receive traffic information through communication with other terminal which is not located in the communication shadow zone. Thus, the terminals V7 and V9 can receive the broadcast of traffic information without interruption of communication. Further, from the viewpoint of a traffic broadcasting company, communication shadow zones are reduced and the range of broadcast reception can be substantially increased without excessive investment for traffic information broadcasting.

Referring to FIG. 12, for example, there is shown a subnet mesh network consisting of terminals V2, V5, V7, V8, V10, and V11 having preference for music of the same genre. If a music file of a specific title is required, the terminal V2 belonging to such a mesh network transmits a message only to the terminals V5, V7, V8, V10, and V11 included in the subnet, rather than transmitting a message (query packet) requesting the music file to the entire wireless mesh network. As a result, the amount of communication is decreased, and the search time of a music file is reduced.

As described thus far, those skilled in the art related to the field of the present invention would understand that various substitutions, modifications, and changes are possible within the technical spirit of the present invention, without being limited to the exemplary embodiments and attached Figures described herein.

What is claimed is:

1. A motor vehicle navigation terminal, comprising:
a transmitting/receiving unit configured to transmit a message containing information about a subject of interest and to receive a response message from a remote terminal about a second terminal sharing the subject of interest; and
a controller configured to,
form a network about the subject of interest with the second terminal based on information included in the response message, wherein the information included in the response message includes second terminal identification information and communication route information for communicating with the second terminal about the subject of interest, or
extract, from the response message, information about a pre-existing network about the subject of interest, and communicate with the second terminal via the pre-existing network using the received information about the pre-existing network, wherein the received information about the pre-existing network includes terminal identification information and communication route information for communicating with the second terminal about the subject of interest.

2. The motor vehicle navigation terminal of claim 1, wherein the response message includes information about another terminal sharing the subject of interest.

3. The motor vehicle navigation terminal of claim 2, wherein the controller is configured to form the network together with the second terminal and the another terminal based on the received information about the another terminal.

4. The motor vehicle navigation terminal of claim 3, wherein the received information includes terminal identification information and communication route information for communicating with the another terminal.

5. The motor vehicle navigation terminal of claim 3, further comprising:
a display configured to display a configuration of the formed network or the pre-existing network.

6. The motor vehicle navigation terminal of claim 5, wherein, when there are a plurality of subjects of interest, a plurality of networks are formed or identified corresponding to the respective subjects of interest, and the display is controlled to display identifiers corresponding to the networks and to selectively display a configuration of one of the plurality of networks in accordance with a selection of a corresponding identifier.

7. The motor vehicle navigation terminal of claim 3, wherein the formed network or the pre-existing network is a subnet of a network related to a location of the terminal.

8. The motor vehicle navigation terminal of claim 1, wherein the pre-existing network comprises the second terminal and another terminal sharing the subject of interest.

9. The motor vehicle navigation terminal of claim 8, wherein, when communication with a specific terminal connected to the formed network or to the pre-existing network is interrupted for more than a preset time, the controller is configured to transmit information about the specific terminal to at least one different terminal sharing the subject of interest.

10. The motor vehicle navigation terminal of claim 8, wherein the received information about the pre-existing network includes terminal identification information and communication route information of the another terminal connected to the pre-existing network.

11. The motor vehicle navigation terminal of claim 1, wherein the message is one of a route request message and a path request message, and the response message is one of a route response message and a path response message.

12. The motor vehicle navigation terminal of claim 11, wherein the information about the subject of interest is recorded in reserved areas of the one of a route request message and a path request message and in reserved areas of the one of a route response message and a path response message.

13. The motor vehicle navigation terminal of claim 1, wherein the remote terminal is the second terminal.

14. A method of communicating performed by a motor vehicle navigation terminal via a network, the method comprising:
transmitting a message containing information about a subject of interest;
receiving a response message from a remote terminal about a second terminal sharing the subject of interest; and
forming a network about the subject of interest with the second terminal based on information included in the response message, wherein the information included in the response message includes second terminal identification information and communication route information for communicating with the second terminal about the subject of interest, or extracting, from the response message, information about a pre-existing network about the subject of interest, and communicating with the second terminal via the pre-existing network using the received information about the pre-existing network, wherein the received information about the pre-existing network includes terminal identification information and communication route information for communicating with the second terminal about the subject of interest.

15. The method of claim 14, wherein the response message includes information about another terminal sharing the subject of interest.

16. The method of claim 15, wherein the forming step comprises:
forming the network with the second terminal and the another terminal in response to the received information about the another terminal.

17. The method of claim 16, wherein the received information about the another terminal includes terminal identification information and communication route information for communicating with the another terminal.

18. The method of claim 16, further comprising:
displaying a configuration of the formed network or the pre-existing network.

19. The method of claim 18, further comprising:
wherein when there are a plurality of subjects of interest, forming or identifying a plurality of networks corresponding to respective subjects of interest; and
displaying identifiers corresponding to the networks and selectively displaying a configuration of one of the plurality of networks in accordance with a selection of a corresponding identifier.

20. The method of claim 16, wherein the formed network or the pre-existing network is a subnet of a network related to a location of the terminal.

21. The method of claim 14, wherein the pre-existing network comprises the second terminal and another terminal sharing the subject of interest.

22. The method of claim 21, further comprising:
if communication with a specific terminal connected to the formed network or to the pre-existing network is interrupted for more than a preset time, transmitting information about the specific terminal whose communication is interrupted to at least one different terminal connected to the formed network or the pre-existing network.

23. The method of claim 21, wherein the information about the pre-existing network includes terminal identification information and communication route information about the another terminal connected to the pre-existing network.

24. The method of claim 14, wherein the message is one of a route request message and a path request message, and the response message is one of a route response message and a path response message.

25. The method of claim 24, further comprising:
recording the information about the subject of interest in reserved areas of the one of a route request message and a path request message and in reserved areas of the one of a route response message and a path response message.

26. The method of claim 14, wherein the remote terminal is the second terminal.

27. A motor vehicle, comprising:
a navigation terminal, including
a transmitting/receiving unit configured to transmit a message containing information about a subject of interest and to receive a response message from a remote terminal about a second terminal sharing the subject of interest; and
a controller configured to
form a network about the subject of interest with the second terminal based on information included in the response message, wherein the information included in the response message includes second terminal identification information and communication route information for communicating with the second terminal about the subject of interest, or
extract, from the response message, information about a pre-existing network about the subject of interest, and communicate with the second terminal via the pre-existing network using the received information about the pre-existing network, wherein the received information about the pre-existing network includes terminal identification information and communication route information for communicating with the second terminal about the subject of interest.

28. The motor vehicle of claim 27, wherein the remote terminal is the second terminal.

* * * * *